(12) United States Patent
Plummer

(10) Patent No.: US 10,060,101 B2
(45) Date of Patent: Aug. 28, 2018

(54) BACKFLOW AND BREAKAWAY CHECK VALVE

(71) Applicant: Melvin Plummer, Los Angeles, CA (US)

(72) Inventor: Melvin Plummer, Los Angeles, CA (US)

( * ) Notice: Subject to any disclaimer, the term of this patent is extended or adjusted under 35 U.S.C. 154(b) by 79 days.

(21) Appl. No.: 15/138,843

(22) Filed: Apr. 26, 2016

(65) Prior Publication Data

US 2017/0307097 A1    Oct. 26, 2017

(51) Int. Cl.
*F16K 15/03* (2006.01)
*E03B 9/04* (2006.01)
*F16K 17/34* (2006.01)
*F16K 37/00* (2006.01)
*F16K 17/36* (2006.01)

(52) U.S. Cl.
CPC ............. *E03B 9/04* (2013.01); *F16K 15/036* (2013.01); *F16K 17/34* (2013.01); *F16K 17/363* (2013.01); *F16K 37/0041* (2013.01)

(58) Field of Classification Search
CPC ...... F16K 15/038; F16K 17/34; F16K 17/363; E03B 9/04

USPC .......................................... 137/68.14, 512.15
See application file for complete search history.

(56) References Cited

U.S. PATENT DOCUMENTS 2,054,561 A * 9/1936 Greenberg .............. F16K 15/03
 137/272
3,913,603 A * 10/1975 Torres .................... B64D 37/32
 137/614

* cited by examiner

Primary Examiner — P. Macade Nichols
(74) Attorney, Agent, or Firm — Michael N. Cohen; Cohen IP Law Group PC

(57) ABSTRACT

A dual plate backflow and breakaway check valve designed to mount above grade. The dual plate check valve includes a barrel assembly having an upper portion, a lower portion and an annular groove. An upper dual valve includes an upper front plate and an upper back plate. A lower dual valve includes a lower front plate and a lower back plate. A lower valve keeper bar moves up from between a plurality of lower valve stay tabs upon breakage of the annular groove thereby allowing the lower front plate and the lower back plate to rotate about a lower valve pin and closing the lower dual valve upon a lower barrel bevel and simultaneously allowing the upper front plate and the upper back plate to rotate about an upper valve pin and closing upon an upper barrel bevel.

20 Claims, 11 Drawing Sheets

BACKFLOW AND BREAKAWAY CHECK VALVE

CROSS-REFERENCE TO RELATED APPLICATIONS

Not Applicable.

STATEMENT REGARDING FEDERALLY SPONSORED RESEARCH AND DEVELOPMENT

Not Applicable.

FIELD OF THE DISCLOSURE

The present invention relates generally to check valves, and more particularly to a dual plate check valve contained within a breakaway barrel/casing adaptable to install above grade, under wet barrel fire hydrants and/or in line with all kinds of pipe conveying fluids to prevent fluid loss and property damage when fire hydrants and/or pipes are damaged.

DISCUSSION OF RELATED ART

Presently, a variety of dual plate check valves are available in the market. However, none of them provide any type of fast-locking mechanism or actuation principles which are installed completely above grade. Conventional dual plate check valves do not include an emergency warning system to alert individuals when pipes are damaged. Also, there is no arrangement for the prevention of the fluid back flow after the device is damaged. Further, in the existing check valves, there is a restriction to loss in initial fluid pressure so as to open up the valve while allowing a large amount of fluid through the valve before closing. Moreover, most of the existing devices are complex in use, design and are expensive. Due to these aforementioned problems, the dual plate check valves presently in use have not been very popular.

One of the existing devices provides a slow valve closing feature when the fire hydrant and/or pipes are damaged in an attempt to diminish water hammer which is caused when large amounts of flowing water is stopped causing a back pressure which can damage piping downstream. All of these conventional check valve devices require them to be installed below grade or within the water main piping requiring expensive installation and unacceptable water flow restrictions.

Therefore, there is a need for a dual plate check valve that would provide an inversely mounted dual plate check valve. Such a needed device would be simple, cost effective and would function over a long period of time without any maintenance. Further, such a needed device would provide a fast-locking mechanism to prevent a large amount of water/fluid loss when fire hydrants and/or pipelines are damaged by vehicles or other forces. Such a needed device would have an emergency warning system to alert individuals when the fire hydrants and/or pipelines are damaged. Moreover, such a device would include a fluid back flow prevention system to prevent contamination of the water/fluid system if the device itself is damaged. Such a device would be easy to install under new wet barrel fire hydrants and/or in line with pipeline and would be reinstalled or replaced under an existing fire hydrant and/or pipeline. Finally, such a needed device would reduce the cost of collateral damage caused by water and/or fluids gushing from damaged pipes. The present embodiment accomplishes these objectives.

SUMMARY OF THE DISCLOSURE

The present invention is a dual plate backflow and breakaway check valve designed to mount above grade, under a wet barrel fire hydrant and/or in line with all kinds of pipe conveying fluids to prevent fluid loss and property damage when fire hydrants and/or pipes are damaged. The dual plate backflow and breakaway check valve comprises a barrel assembly having an upper portion, a lower portion, an annular groove, a top mounting flange and a bottom mounting flange. The dual plate check valve further comprises an upper dual valve and a lower dual valve. The upper dual valve includes an upper front plate and an upper back plate arranged inside the upper portion of the barrel assembly utilizing an upper valve pin and a plurality of upper valve springs. The upper valve pin is designed to insert through a plurality of upper plate pin holes. The upper valve pin, the plurality of upper plate pin holes and the plurality of upper valve springs firmly lock the upper front plate and an upper back plate inside the upper portion. The lower dual valve includes a lower front plate and a lower back plate arranged inside the lower portion of the barrel assembly utilizing a lower valve pin and a plurality of lower valve springs. The lower valve pin is designed to insert through a plurality of lower plate pin holes. The lower valve pin, the plurality of lower plate pin holes and the plurality of lower valve springs facilitate fine locking of the lower front plate and a lower back plate inside the lower portion of the barrel assembly. A lower valve stabilizer bar is attached inside the lower portion and an upper valve stabilizer bar is attached inside the upper portion of the barrel assembly.

A plurality of lower valve stay tabs is attached perpendicular to the lower front plate and the lower back plate of the lower dual valve. A plurality of witness holes is located at the lower front plate and lower back plate. A plurality of flange holes is arranged at a circumference of both the top mounting flange and the bottom mounting flange. The plurality of flange holes is designed to attach the dual plate check valve under the fire hydrant and/or in line with at least one pipeline. The dual plate check valve further comprises a lower valve keeper bar arranged within the upper portion of the barrel assembly. The breakage of the annular groove causes fluid to enter into the barrel assembly that allows the lower valve keeper bar to rotate about the lower valve pin so as to move the lower valve keeper bar upwards and close the upper dual valve upon the bevel in the barrel walls resulting in a back pressure of the fluid. The dual plate check valve is simple, cost effective and functions over a long period of time without any maintenance.

In the preferred embodiment, the dual plate check valve operates in a normal flow mode, a static flow mode, a partially deployed flow mode and a fully deployed flow mode. The dual plate check valve is mounted entirely above grade level and is not within the main piping system.

A first objective of the dual plate backflow and breakaway check valve is to provide a breakaway coupling having an improved shutoff. Another objective of the present invention is to provide a breakaway pipe coupling that automatically stops or terminates flow at the point of breakage and upon damage to the pipelines and/or fire hydrants. Yet another objective of the present invention is to provide a backflow and surge protection device that is entirely mounted above grade and requires no special tools or hardware to install.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention, thus the drawings are generalized in form in the interest of clarity and conciseness.

DETAILED DESCRIPTION OF THE PREFERRED EMBODIMENT

Figure 1:
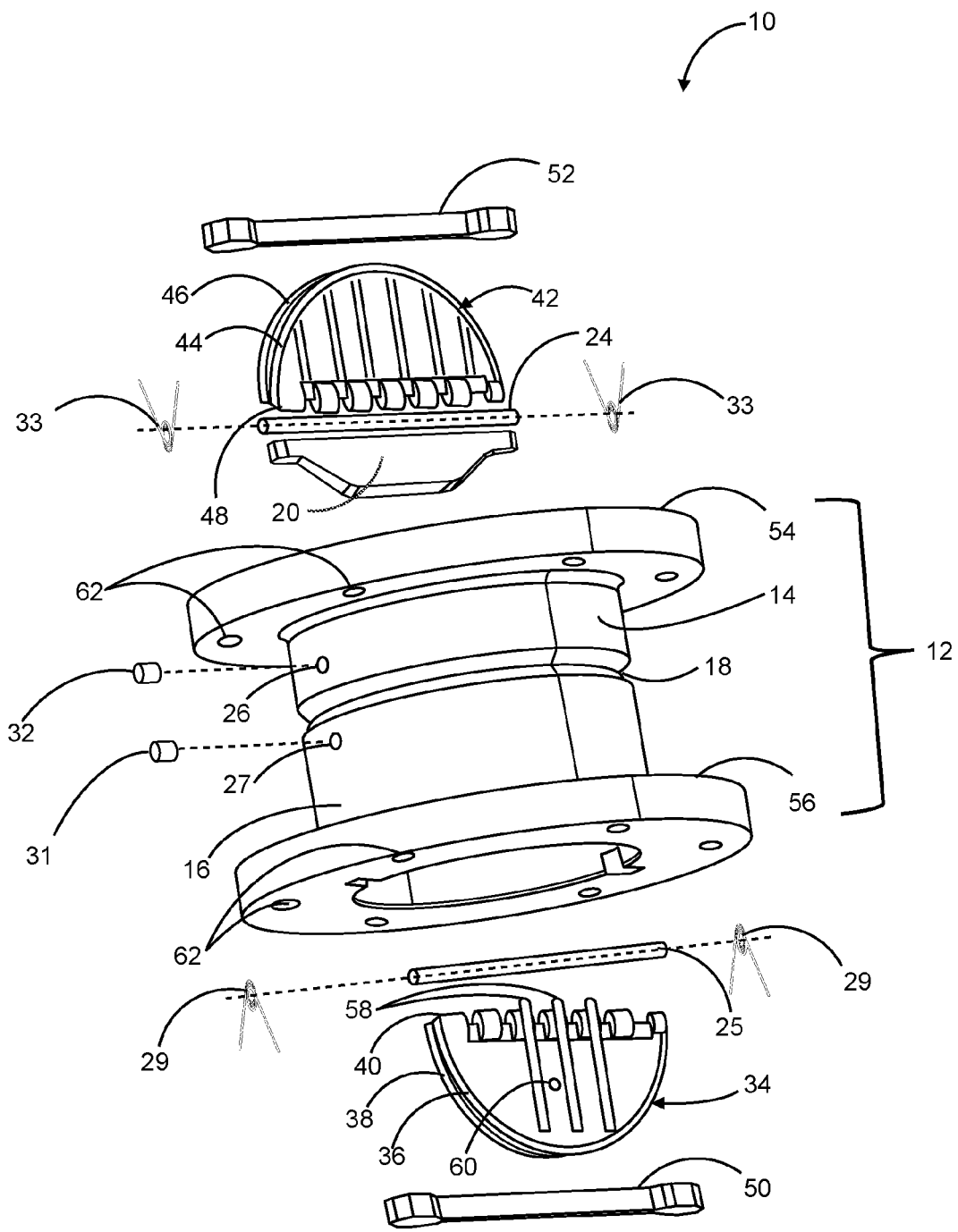
FIG. 1 is an exploded view of a dual plate backflow and breakaway check valve according to the preferred embodiment of the present invention.

The following describes example embodiments in which the present invention may be practiced. This invention, however, may be embodied in many different ways, and the description provided herein should not be construed as limiting in any way.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Various inventive features are described below that can each be used independently of one another or in combination with other features. However, any single inventive feature may not address any of the problems discussed above or only address one of the problems discussed above. Further, one or more of the problems discussed above may not be fully addressed by any of the features described below.

Referring to FIGS. 1-10 of the drawings, according to the present invention is a dual plate inversely mounted backflow and breakaway check valve illustrated in different views and generally designated by the reference numeral 10. In the preferred embodiment, the dual plate backflow and breakaway check valve 10 is adaptable to install above grade, under wet barrel fire hydrants and/or in line with all kinds of pipe conveying fluids to prevent fluid loss and property damage when fire hydrants and/or pipes are damaged.

Referring to FIG. 1, an exploded view of the dual plate backflow and breakaway check valve 10 is illustrated. The dual plate check valve 10 comprises a barrel assembly 12 having an upper portion 14, a lower portion 16, an annular groove 18, a top mounting flange 54 and a bottom mounting flange 56. The dual plate check valve 10 further comprises an upper dual valve 42 and a lower dual valve 34. The upper dual valve 42 includes an upper front plate 44 and an upper back plate 46 arranged inside the upper portion 14 of the barrel assembly 12 utilizing an upper valve pin 24 and a plurality of upper valve springs 33. The upper valve pin 24 is designed to insert through a plurality of upper plate pin holes 48. The upper valve pin 24, the plurality of upper plate pin holes 48 and the plurality of upper valve springs 33 firmly lock the upper front plate 44 and an upper back plate 46 inside the upper portion 14. The lower dual valve 34 includes a lower front plate 36 and a lower back plate 38 arranged inside the lower portion 16 of the barrel assembly 12 utilizing a lower valve pin 25 and a plurality of lower valve springs 29. The lower valve pin is designed to insert through a plurality of lower plate pin holes 40. The lower valve pin 25, the plurality of lower plate pin holes 40 and the plurality of lower valve springs 29 facilitate fine locking of the lower front plate 36 and a lower back plate 38 inside the lower portion 16 of the barrel assembly 12. In this way, the dual plate backflow and breakaway check valve device 10 provides a fast-locking mechanism to prevent a large amount of fluid loss when the fire hydrants and/or pipelines are damaged and/or broken. A lower valve stabilizer bar 50 is attached inside the lower portion 16 and an upper valve stabilizer bar 52 is attached inside the upper portion 14 of the barrel assembly 12.

As shown in FIG. 1, the upper dual valve 42 is inserted through the upper portion 14 of the barrel assembly 12 and the lower dual valve 34 is inserted through the lower portion 16 of the barrel assembly 12. A plurality of lower valve stay tabs 58 is attached perpendicularly to the lower front plate 36 and the lower back plate 38 of the lower dual valve 34. A plurality of witness holes 60 is located at the lower front plate 36 and lower back plate 38. A plurality of flange holes 62 is arranged at a circumference of both the top mounting flange 54 and the bottom mounting flange 56. The plurality of flange holes 62 is designed to attach the dual plate check valve 10 under the fire hydrant and/or in line with at least one pipeline. The dual plate check valve 10 further comprises a lower valve keeper bar 20 arranged within the upper portion 14 of the barrel assembly 12. The lower valve keeper bar 20 moves up from between the plurality of lower valve stay tabs 58 upon breakage of the annular groove 18 thereby allowing the lower front plate 36 and lower back plate 38 to rotate about the lower valve pin 25 and to close the lower dual valve 34 upon an lower barrel bevel 22 (See FIG. 8). Simultaneously, the upper front plate 44 and the upper back plate 46 rotate about the upper valve pin 24 and close upon an upper barrel bevel 28 (See FIGS. 6 and 8).

The upper front plate 44 and the upper back plate 46 are assembled around the upper valve pin 24 inserted through the plurality of upper plate pin holes 48 incorporating the plurality of upper valve springs 33 which keeps the upper dual valve 42 in the closed position against the upper barrel bevel 28 (See FIGS. 6 and 8) during a static flow mode of the dual plate backflow and breakaway check valve 10.

Similarly, the lower front plate 36 and the lower back plate 38 are assembled around the lower valve pin 25 inserted through the plurality of lower plate pin holes 40 incorporating the plurality of lower valve springs 29 which facilitate the rotation of the lower front plate 36 and lower back plate 38. Upon actuation, the lower valve keeper bar 20 is moved away from the plurality of lower valve stay tabs 58 of the lower dual valve 34. This allows the lower dual valve 34 to close upon the lower barrel bevel 22 (See FIG. 8) and minimizes the surge of fluid while allowing the plurality of witness holes 60 to indicate a stream of effluence 65 (See FIG. 9). At least one upper pin mounting hole 26 connects the upper dual valve 42 and the upper portion 14 of the barrel assembly 12 together utilizing at least one upper pin set screw 32. Similarly, at least one lower pin mounting hole 27 located at the lower portion 16 connects the lower dual valve 34 and the lower portion 16 of the barrel assembly 12 together utilizing at least one lower pin set screw 31.

In the preferred embodiment, the plurality of witness holes 60 located at the lower front plate 36 and lower back plate 38 has a diameter of ¼ inch. The location of damage to fire hydrants and pipelines can be indicated and readily visualized by the relatively small size of the witness holes 60. The elevated pressure of the fluid contained within the lower dual valve 34 causes a limited high-pressure stream of effluence 65 (See FIG. 9) to emit from the lower dual valve 34. The witness holes 60 also provide some relief from water hammer generated in a pipeline system at the time of an automatic shutoff. The witness holes 60 can be eliminated on devices installed in line with pipes conveying caustic of explosive fluids.

Figure 2:
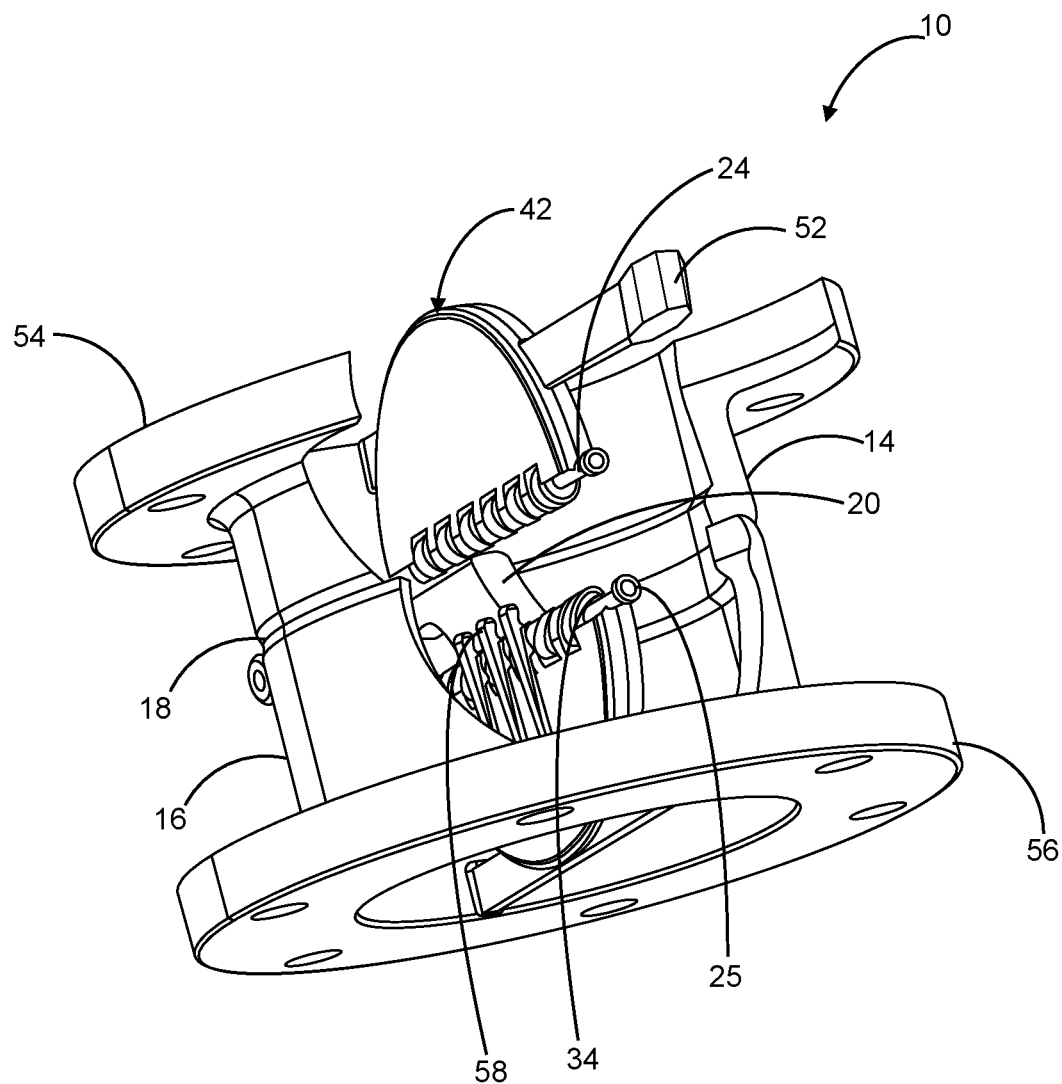
FIG. 2 is a side cut away view of the present invention, illustrating an upper dual valve, a lower dual valve, a top mounting flange and a bottom mounting flange of the dual plate backflow and breakaway check valve.
Figure 3:
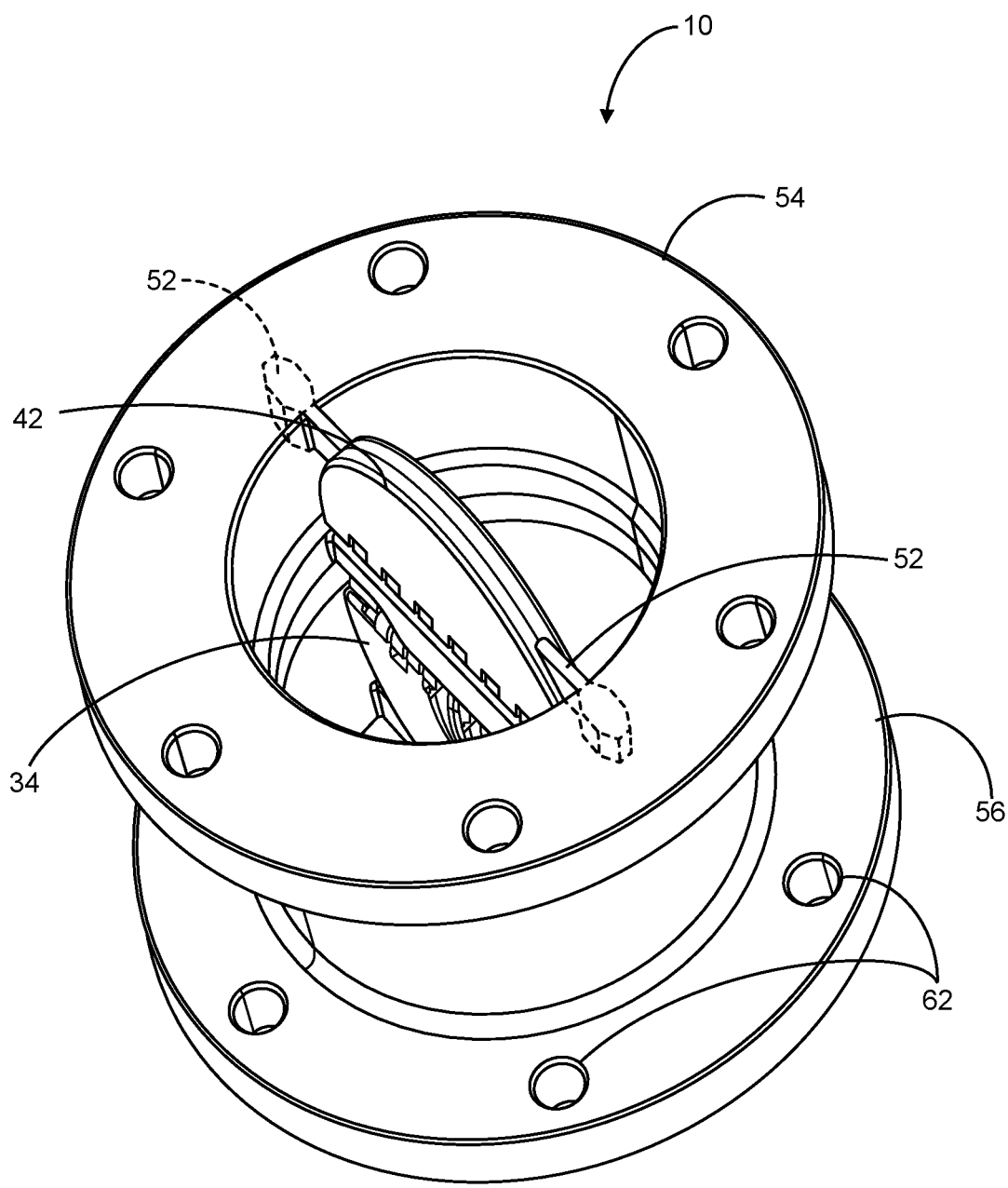
FIG. 3 is a top perspective view of the present invention, illustrating the upper dual valve, the top mounting flange, the bottom mounting flange and a plurality of flange holes of the dual plate backflow and breakaway check valve.
Figure 4:
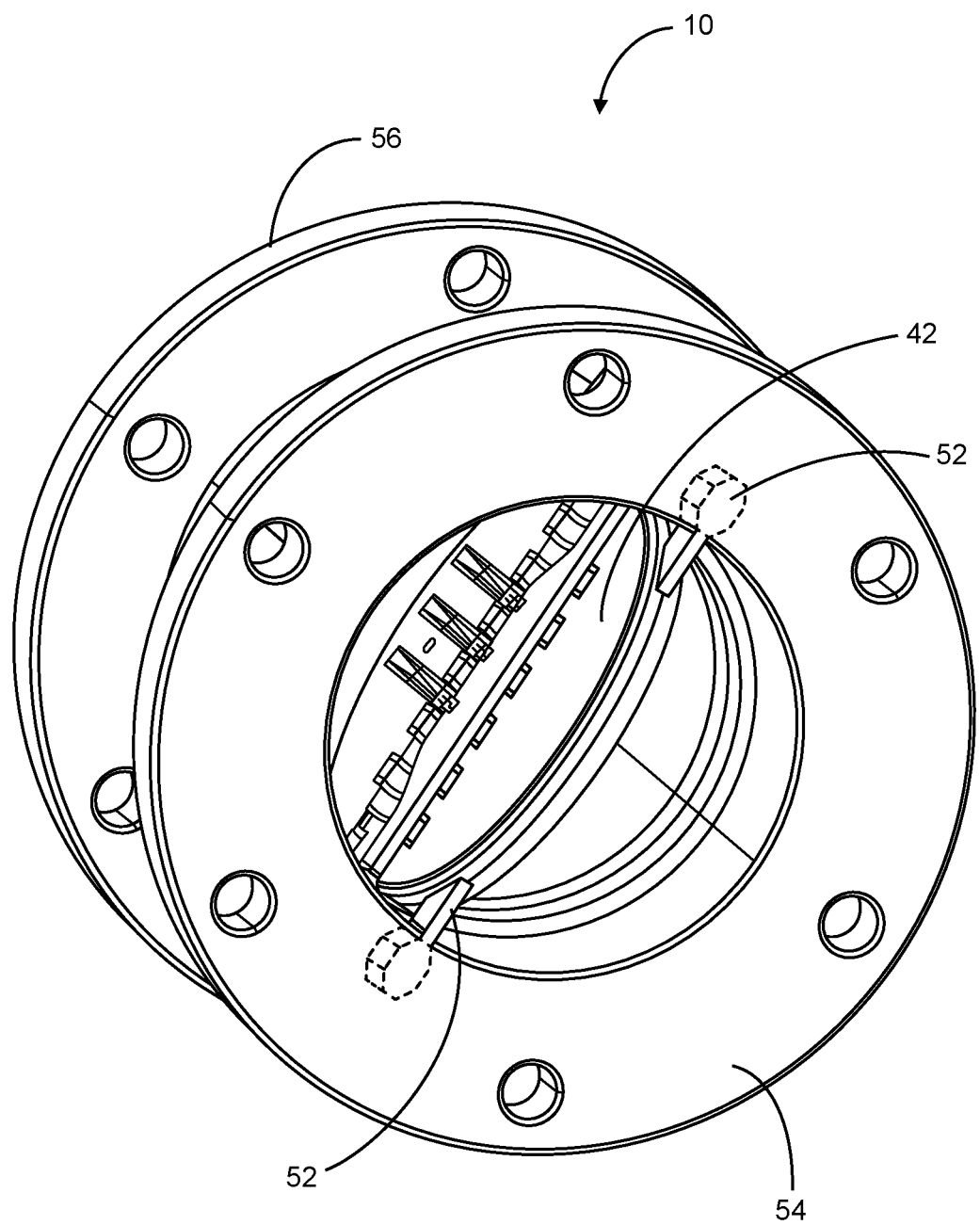
FIG. 4 is a top perspective view of the present invention, illustrating the upper dual valve, a lower valve keeper bar and an upper valve stabilizer bar of the dual plate backflow and breakaway check valve.

Referring to FIGS. 2-4, the top mounting flange 54 is attached to an upper portion 14 and the lower mounting flange 56 is attached to a lower portion 16. The lower dual valve 34 is arranged inside of the lower portion 16 utilizing the lower valve pin 25 and the upper dual valve 42 is arranged inside of the upper portion 14 utilizing the upper valve pin 24. The annular groove 18 and the lower valve keeper bar 20 are arranged within the upper portion of the barrel assembly 14.

Figure 5:
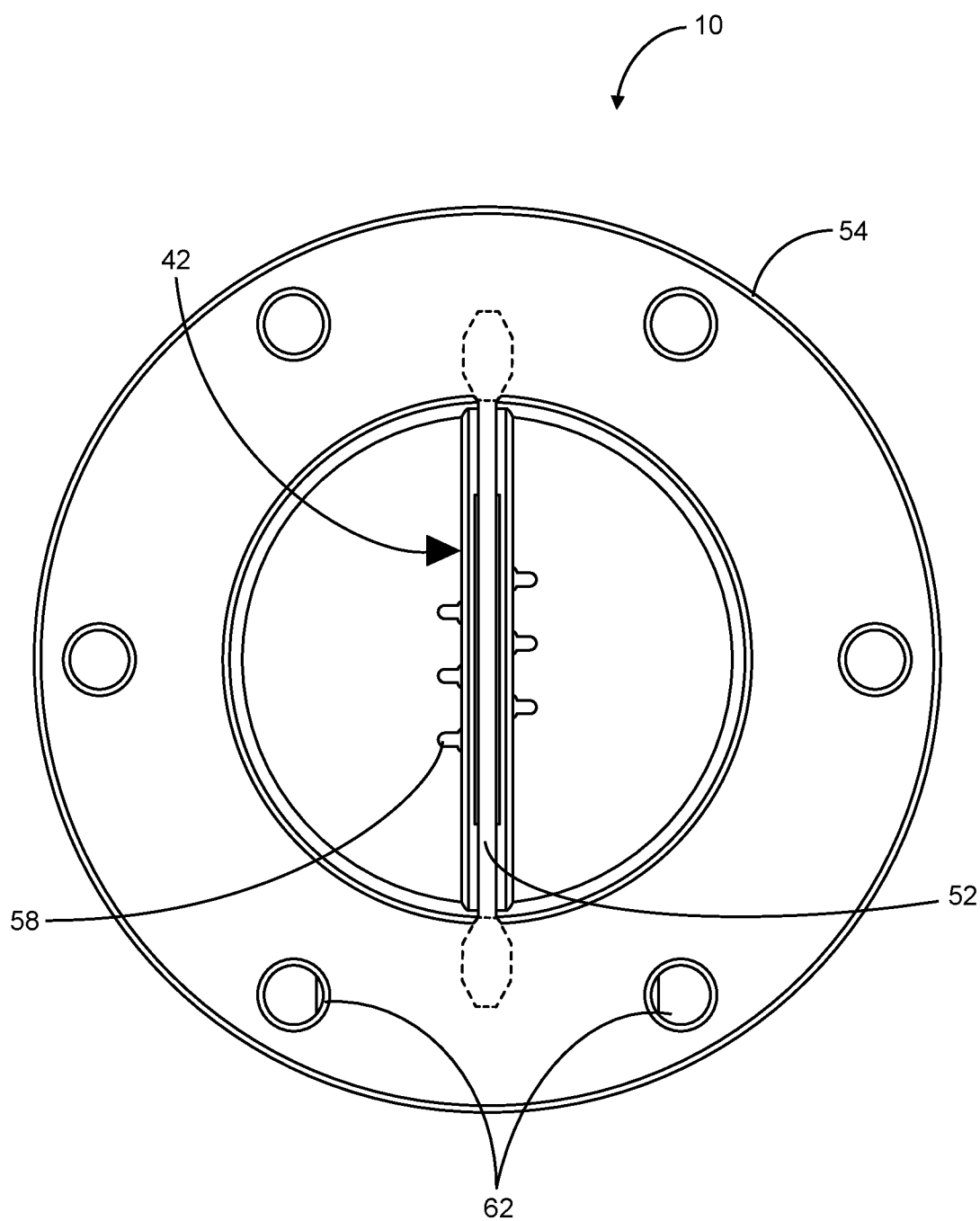
FIG. 5 is the top plan view of the present invention, illustrating the upper and lower dual valves of the dual plate backflow and breakaway check valve in an open position.

FIG. 5 is the top plan view of the present invention, illustrating the upper dual valve 42 in an open position. The lower valve stabilizer bar 50 (See FIG. 7A) and the upper valve stabilizer bar 52 prevent the upper dual valve 42 from rotating more than 90 degrees.

Figure 6:
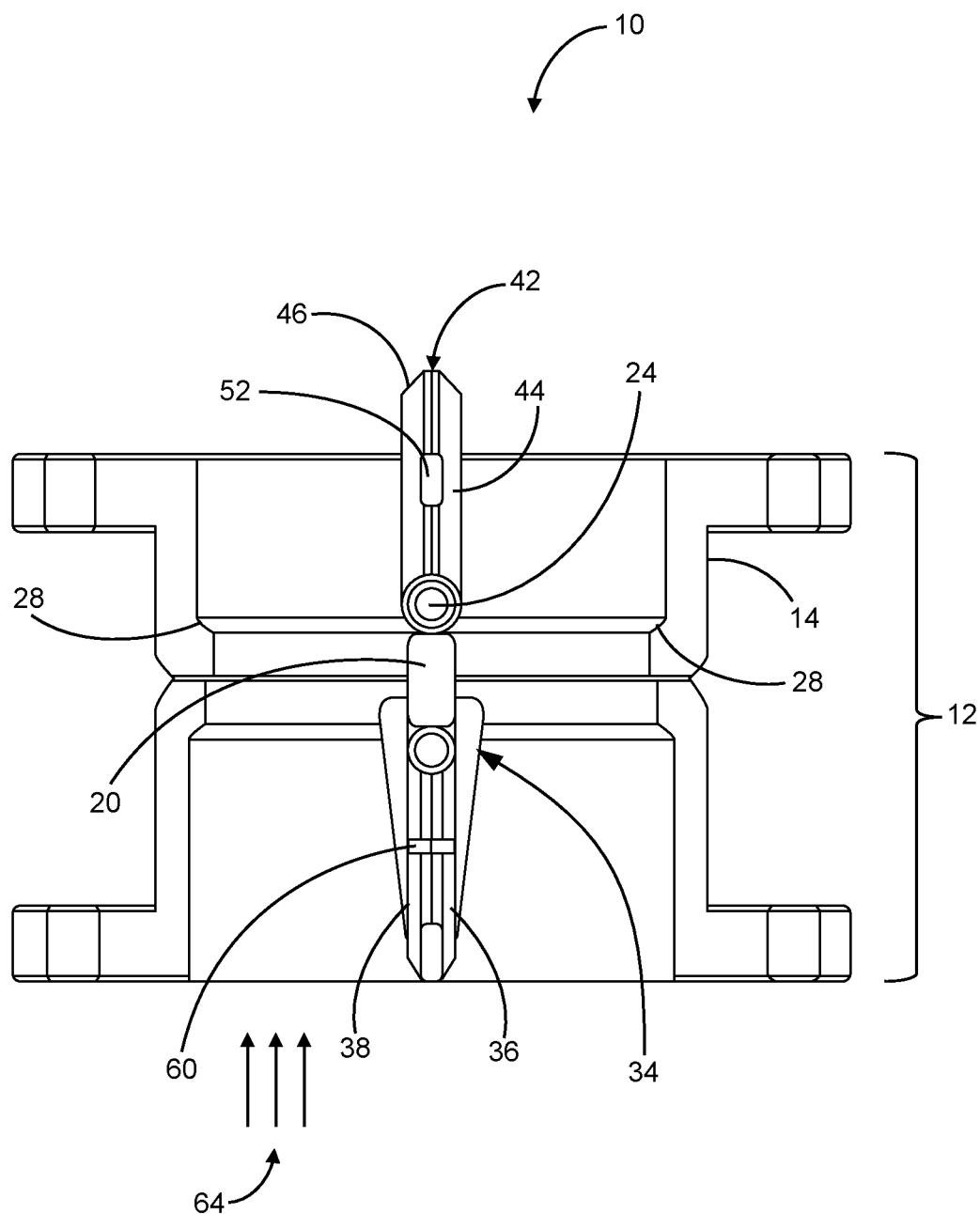
FIG. 6 is a front cross-sectional view of the present invention, illustrating the dual plate backflow and breakaway check valve in a normal flow mode.

FIG. 6 is a front cross-sectional view of the present invention, illustrating the dual plate check valve 10 in a normal flow mode. In a normal fluid flow mode, the fluid flowing through the dual plate check valve 10 causes the upper front plate 44 and the upper back plate 46 to open up to a 90 degree angle away from the upper barrel bevel 28 by rotating around the upper valve pin 24 that is connected to the upper pin mounting hole 26 (See FIG. 1). The upper valve stabilizer bar 52 prevents the upper front plate 44 and the upper back plate 46 of the upper dual valve 42 from rotating more than 90 degrees. In the normal flow mode, the upper dual valve 42 and the lower dual valve 34 are in the open position to permit the flow of fluids 64. The witness holes 60 located at the lower front plate 36 and the lower back plate 38 allows the dual stream of effluence 65 (See FIG. 9) to be visible upon damage to the barrel assembly 12.

Figure 7A:
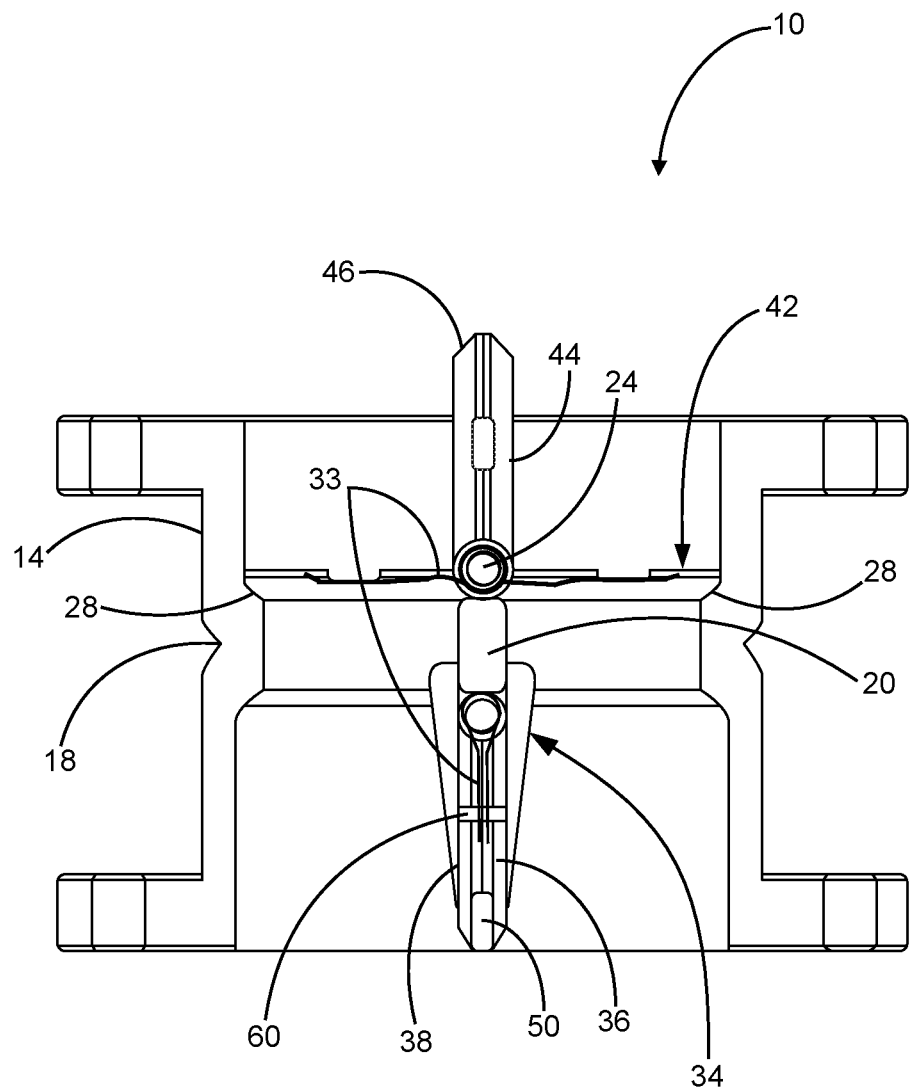
FIG. 7A is a front cross-sectional view of the present invention, illustrating the dual plate backflow and breakaway check valve in a static flow mode.
Figure 7B:
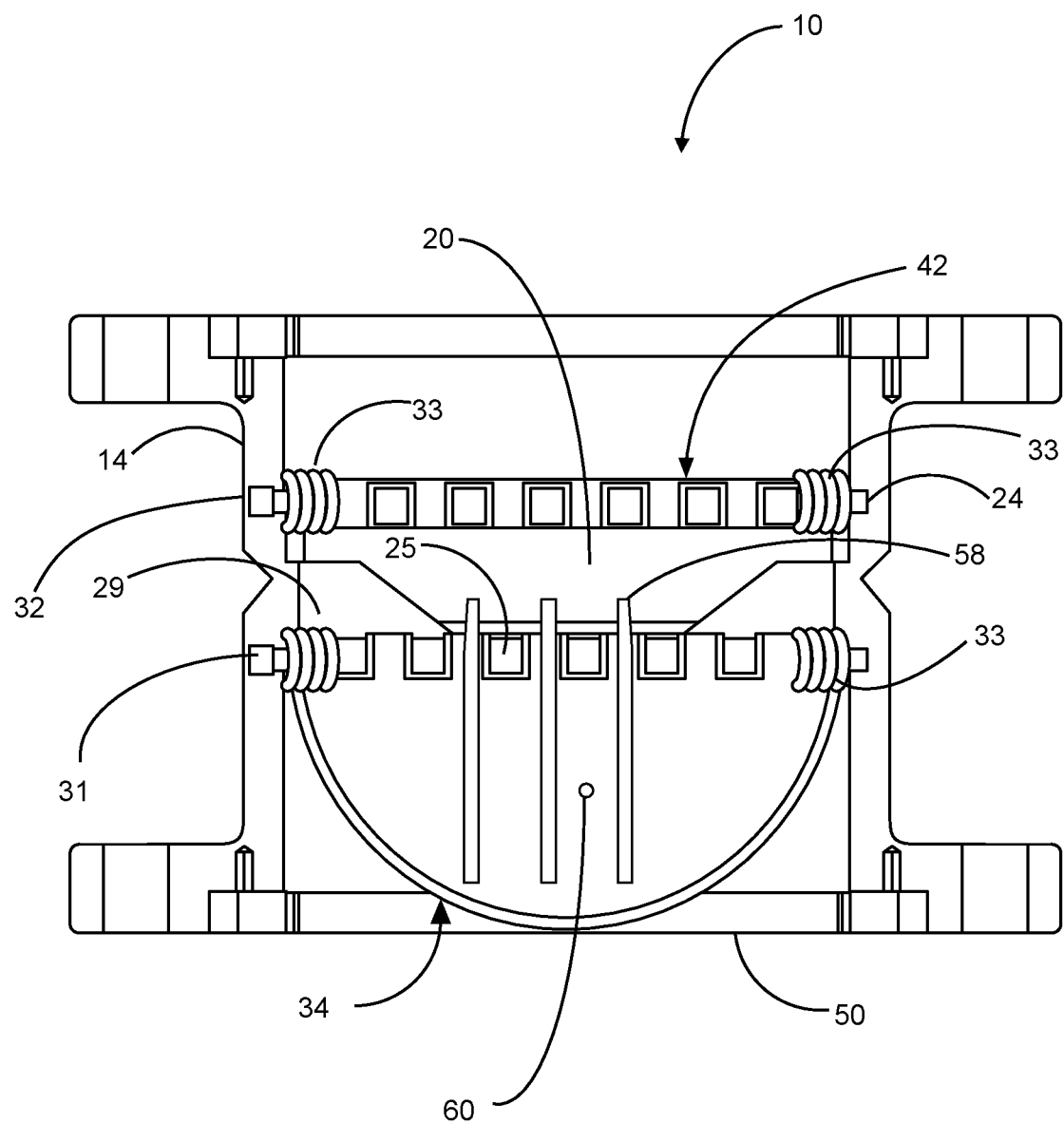
FIG. 7B is a side cross-sectional view of the present invention, illustrating the dual plate backflow and breakaway check valve in the static flow mode.

FIGS. 7A and 7B illustrate front and side cross-sectional views of the present invention, illustrating the dual plate check valve 10 in a static flow mode. In the static flow mode, such as when the dual plate check valve 10 is used in conjunction with a wet barrel fire hydrant and/or pipeline, the upper dual valve 42 remains closed due to its spring-loaded feature caused by the plurality of upper valve springs 33. The plurality of upper valve springs 33 keeps the upper dual valve 42 in a closed position upon the upper barrel bevel 28 when there is no flow of fluid. In the closed position, the upper dual valve 42 functions as an Anti-Terrorist Valve (ATV) which minimizes the insertion of biological or chemical agents into the fluid through the fire hydrant and/or pipeline. The lower dual valve 34 is kept in an open position utilizing the lower valve keeper bar 20 that moves away with the upper portion 14 upon breakage around the annular groove 18. The lower valve stabilizer bar 50 prevents the lower front plate 36 and the lower back plate 38 from rotating in the wrong direction when the lower bar keeper bar 20 moves away upon the shearing of the annular groove 18. The witness holes 60 located at the lower front plate 36 and lower back plate 38 creates a dual warning stream of effluence 65 (See FIG. 9) upon damage to the fire hydrant and/or pipeline. These witness holes 60 can be plugged or eliminated if and when pipes carry caustic and/or flammable liquids.

As shown in FIG. 7B, the upper front plate 44 and upper back plate 46 are assembled around the upper valve pin 24 that is inserted through the upper pin mounting hole 26 (See FIG. 1) incorporating the upper valve springs 33 which keeps the upper dual valve 42 in the closed position against the upper barrel bevel 28 during the static flow mode. The upper pin mounting hole 26 (See FIG. 1) located at the upper portion 14 connects the upper dual valve 42 and the upper portion 14 of the barrel assembly 12 together utilizing the upper pin set screw 32. The lower pin mounting hole 27 located at the lower portion 16 connects the lower dual valve 34 and the lower portion 16 of the barrel assembly 12 together utilizing the lower pin set screws 31 which facilitates the rotation of the lower front plate 36 and the lower back plate 38. Upon actuation, the lower valve keeper bar 20 is moved away from the lower valve stay tabs 58 of the lower dual valve 34. This allows the lower dual valve 34 to close upon the lower barrel bevel 22 (See FIG. 8) and minimizes the surge of fluids.

Figure 8:
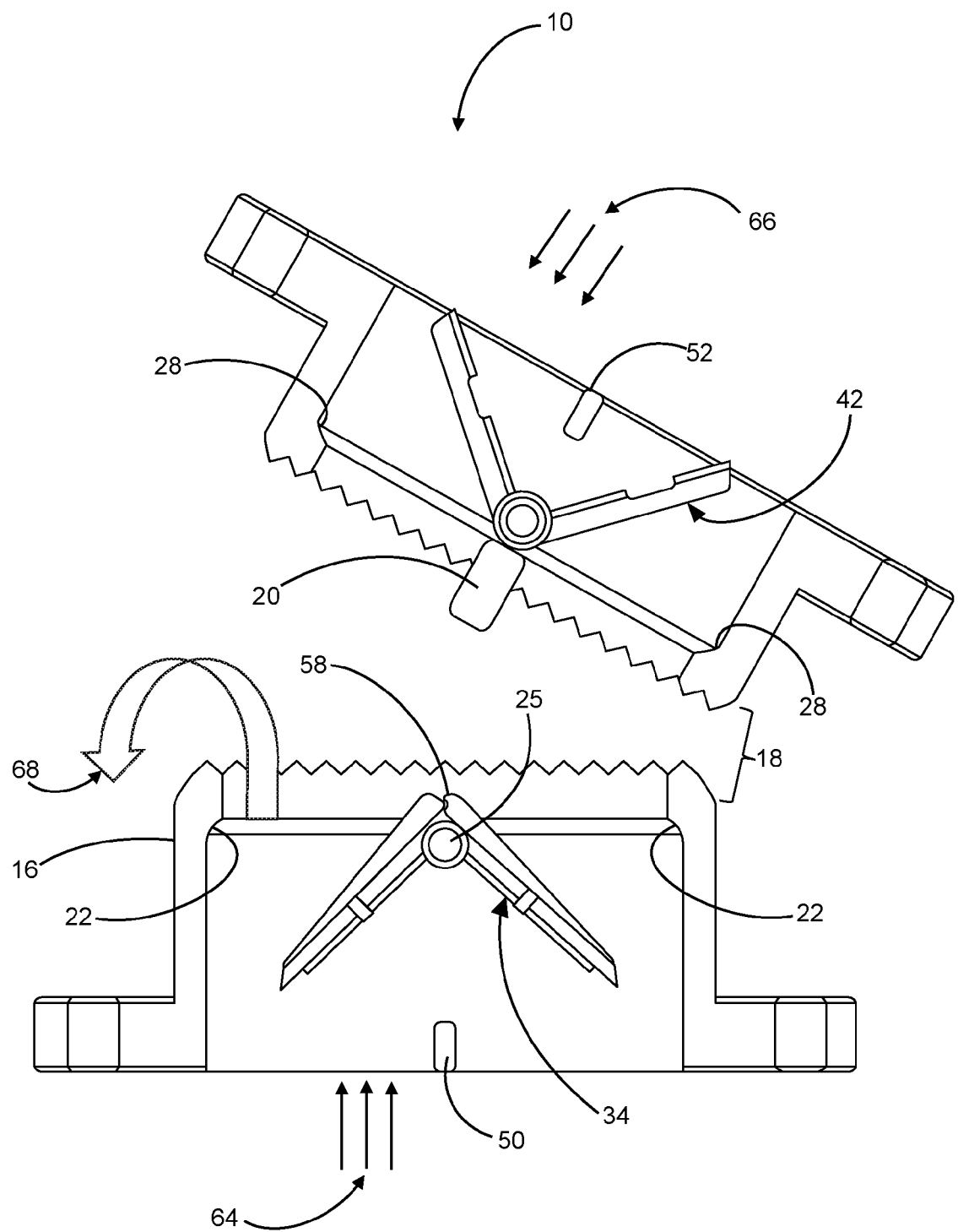
FIG. 8 is a front cross-sectional view of the present invention, illustrating the dual plate backflow and breakaway check valve in a partially deployed flow mode.

FIG. 8 is a front cross-sectional view of the present invention, illustrating the dual plate check valve 10 in a partially deployed mode. During the partially deployed mode, the lower valve keeper bar 20 moves away upon breakage of the annular groove 18 freeing the plurality of lower valve stay tabs 58 of the lower dual valve 34 which can then open when the lower dual valve 34 rotates 90 degree around the lower valve pin 25. Thus, the lower dual valve 34 can seat on the lower barrel bevel 22 of the lower portion 16 and stops the flow of fluid 64. Due to the quick closure of the upper dual valve 42 and lower dual valve 34, a minimal fluid loss 68 is resulted. The upper dual valve 42 starts to close due to the loss in pressure and fluid flow 64 thereby preventing the loss of fluids from the unpressurized portion of the pipeline. A reverse fluid back flow 66 caused by the breakage at the annular groove 18 assists the upper dual valve 42 in its closure state upon the upper barrel bevel 28.

Figure 9:
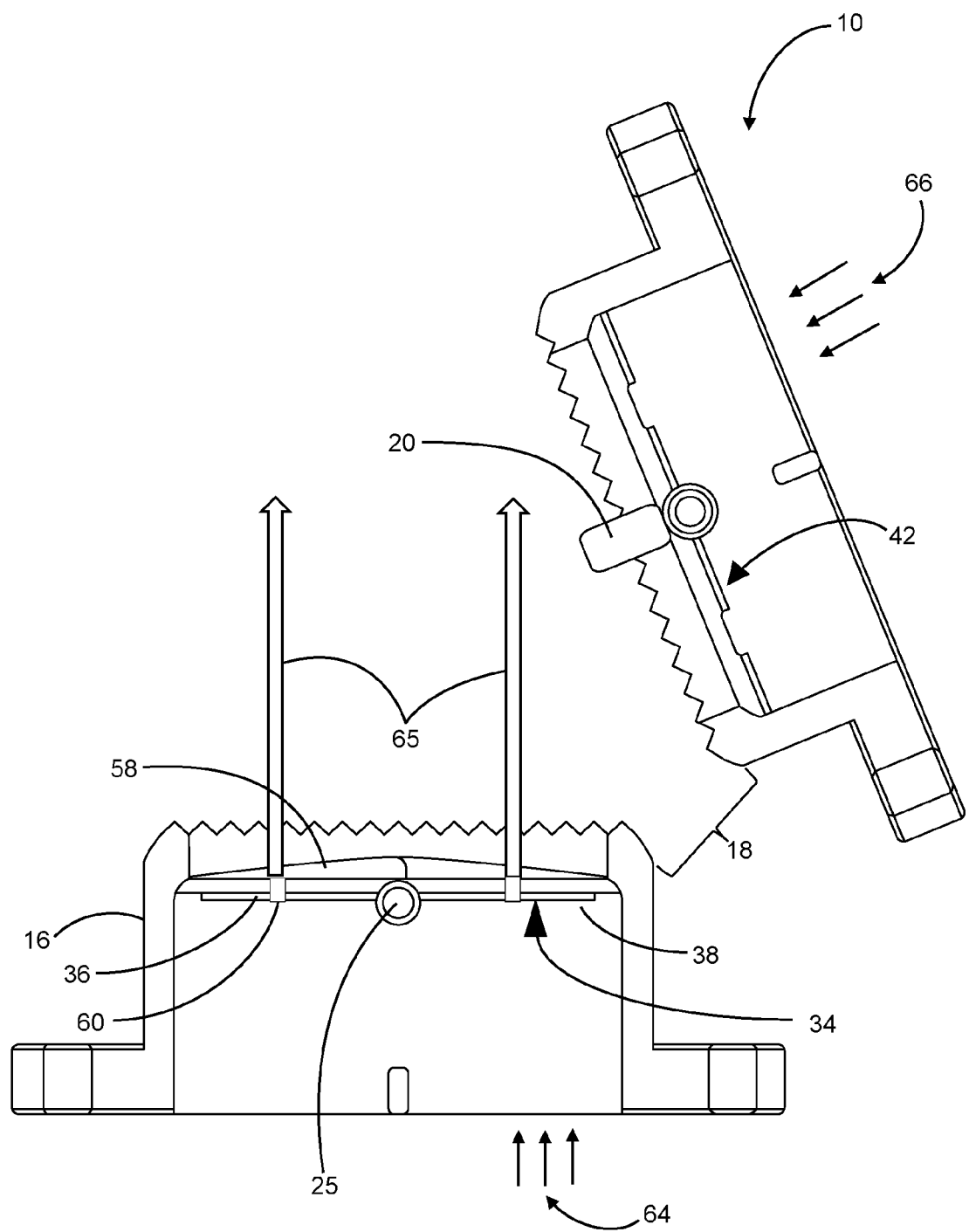
FIG. 9 is a front cross-sectional view of the present invention, illustrating the dual plate backflow and breakaway check valve in a fully deployed stop flow mode.

FIG. 9 is a front cross sectional view of the present invention, illustrating the dual plate check valve 10 in fully-deployed flow mode. The lower valve keeper bar 20 moves out from position upon the breakage of the annular groove 18 freeing the plurality of the lower valve stay tabs 58 and allowing the lower dual valve 34 to close upon the lower barrel bevel 22. During the fully deployed flow mode, the lower dual valve 34 achieves the 90 degree rotation around the lower valve pin 25 due to the fluid flow 64 which is permitted by the displacement of the lower valve keeper bar 20. The upper dual valve 42 remains closed due to the residual back pressure of fluid 66 causing the streams of effluence 65 to be visible through the witness holes 60 in the lower front plate 36 and lower back plate 38 of the lower dual valve 34 due to the fluid pressure 64. The witness holes 60 can be plugged or eliminated if and when pipes carry caustic and/or flammable liquids. In the dual plate backflow and breakaway check valve 10, any type of pipe conveying any type of fluid therein, such as water, crude oil, refined petroleum in all its forms and any other liquids requires no modification to the pipe itself, only the attachment to the valve in a particular area where the pipe may be susceptible to damage and breakage.

Figure 10:
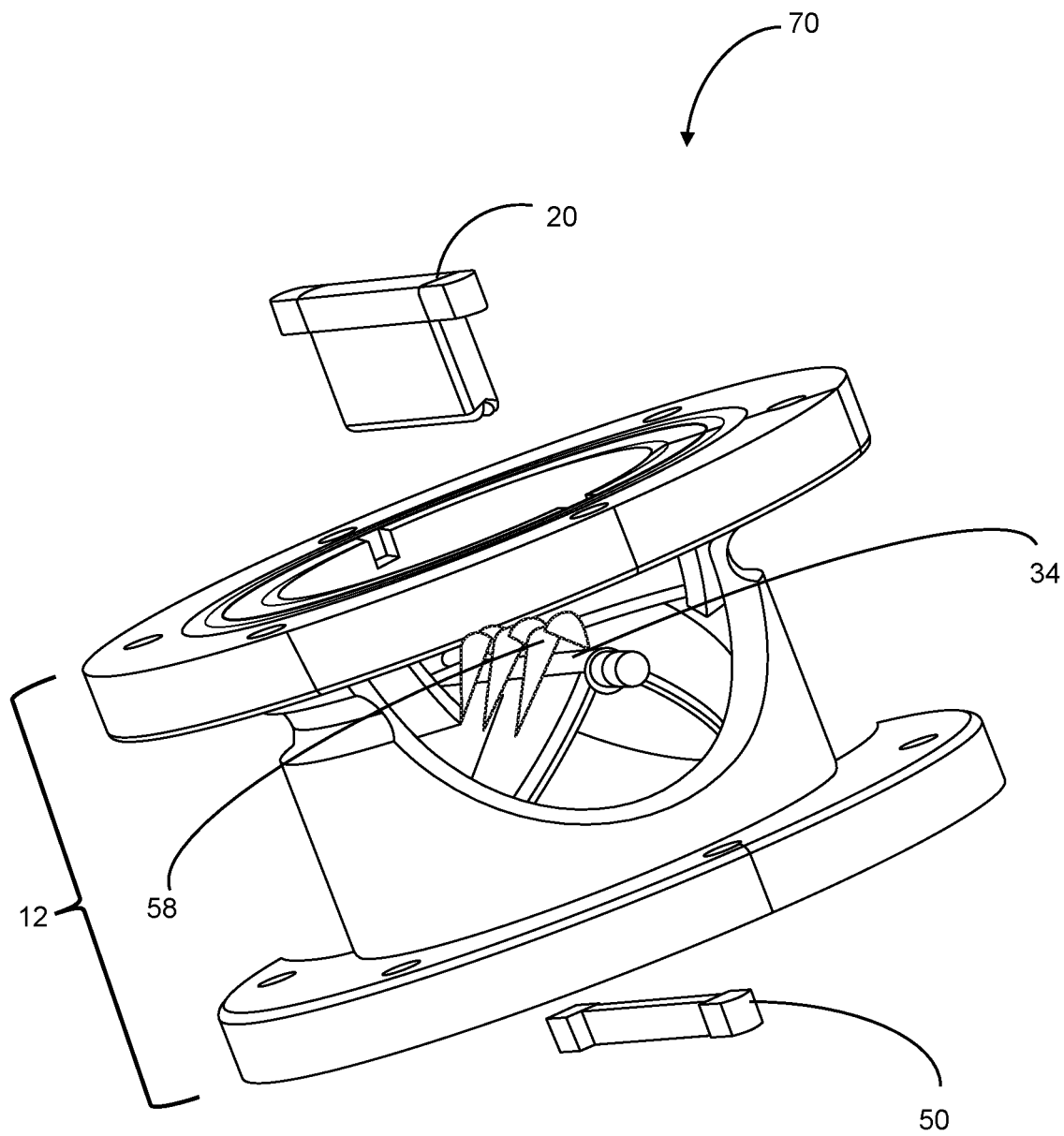
FIG. 10 is an exploded view of another embodiment of the present invention, illustrating a single valve device according to the preferred embodiment of the present invention.

FIG. 10 is an exploded view of another embodiment of the above grade back flow and surge protection shear valve that can be alternatively configured into a single valve device 70 providing surge protection under all types of wet barrel fire hydrants and in line with pipes conveying fluids. This is accomplished by the elimination of all of the components of the backflow protection assemblies and elements that are mounted with the upper portion 14 of the barrel assembly 12 (See FIG. 1).

The dual plate check valve 10 may be of various diameters and may contain various fluids under pressures ranging between 50 and 200 pounds per square inch. Furthermore, the source of fluid pressure is assumed to have a large capacity such that the fluid flow pressure does not decrease over time, particularly within the timeframe of an automatic closing condition. The lower dual valve 34 which acts as a shutoff valve is arranged in a controlled manner so as to rotate to the closing position to ensure that initial closing results in substantially complete shutoff of fluid flow through the lower dual valve 34. The sudden breakage of the annular groove 18 and the automatic shut off of the lower dual valve 34 and the upper dual valve 42 reduces further damage to wet barrel fire hydrants and/or pipelines conveying fluids of all types.

As shown in FIG. 10, the lower dual valve 34 is incorporated with the valve stabilizer bar 50 which also functions as a shedder bar. The shedder bar has a paddle design which activates when the plurality of lower valve stay tabs 58 are freed by the lower valve keeper bar 20. Thus, the fluid flows inside the barrel assembly 12 and causes the spinning of the shedder bar. This spinning generates an alternative magnetic force, which can be picked up by a sensor mounted on the outside of the barrel assembly 12. This provides power whereby the sensor produces a warning signal which can be monitored by a local utility in case of breakage and actuation of the lower dual valve 34.

An advantage of the present invention is that the dual plate check valve 10 provides an emergency warning system to alert individuals when the wet barrel fire hydrants and/or pipelines are damaged. Another advantage of the present invention is that the dual plate check valve 10 is easy to install under the fire hydrant and/or pipeline and can be reinstalled or replaced under an existing fire hydrant and/or pipeline. Yet another advantage of the of the present invention is that dual plate check valve 10 minimizes the vehicular damages as well as decreases damage caused by inundation of fluids.

While a particular form of the invention has been illustrated and described, it will be apparent that various modifications can be made without departing from the spirit and scope of the invention. Accordingly, it is not intended that the invention be limited, except as by the appended claims.

What is claimed is:

1. A dual plate backflow and breakaway check valve comprising:
   a barrel assembly having an upper portion, a lower portion and a groove;
   an upper dual valve having an upper front plate and an upper back plate;
   a lower dual valve having a lower front plate and a lower back plate;
   a lower valve keeper bar arranged within the upper portion, the lower valve keeper bar moves up from between a plurality of lower valve tabs upon breakage of the groove thereby allowing the lower front plate and the lower back plate to rotate about a lower valve pin and closing the lower dual valve upon a lower barrel bevel and allowing the upper front plate and the upper back plate to rotate about an upper valve pin and closing upon an upper barrel bevel; and
   a plurality of holes located at the lower front plate and the lower back plate that enables quick visualization of location of damage to a fire hydrant and the at least one pipeline.

2. The dual plate backflow and breakaway check valve of claim 1 wherein the breakage of the groove causes a residual back pressure of fluid in at least one pipeline connected to the dual plate backflow and breakaway check valve.

3. The dual plate backflow and breakaway check valve of claim 1 further comprises a top mounting flange attached to the upper portion and a bottom mounting flange attached to the lower portion.

4. The dual plate backflow and breakaway check valve of claim 3 wherein a circumference of the top mounting flange and the bottom mounting flange is arranged with a plurality of flange holes.

5. The dual plate backflow and breakaway check valve of claim 1 wherein the upper front plate and the upper back plate are arranged inside the upper portion of the barrel assembly utilizing a plurality of upper valve springs and an upper valve pin designed to insert through a plurality of upper valve seat pin holes.

6. The dual plate backflow and breakaway check valve of claim 1 further comprises at least one upper pin mounting hole to connect the upper dual valve and the upper portion of the barrel assembly together utilizing at least one upper pin set screw.

7. The dual plate backflow and breakaway check valve of claim 1 further comprises an upper valve bar and a lower valve bar attached inside the upper portion and the lower portion, respectively.

8. The dual plate backflow and breakaway check valve of claim 1 wherein the lower front plate and the lower back plate are arranged inside the lower portion of the barrel assembly utilizing a plurality of lower valve springs and a lower valve pin designed to insert through a plurality of lower plate pin holes.

9. The dual plate backflow and breakaway check valve of claim 1 further comprises at least one pin mounting hole to connect the lower dual valve and the lower portion of the barrel assembly together utilizing at least one lower pin set screw.

10. A dual plate backflow and breakaway check valve comprising:
   a barrel assembly having an upper portion, a lower portion and a groove;
   an upper dual valve having an upper front plate and an upper back plate;
   a lower dual valve having a lower front plate and a lower back plate;
   a lower valve keeper bar arranged within the upper portion, the lower valve keeper bar moves up from between a plurality of lower valve tabs upon breakage of the groove thereby allowing the lower front plate and the lower back plate to rotate about a lower valve pin and closing the lower dual valve upon a lower barrel bevel and allowing the upper front plate and the upper back plate to rotate about an upper valve pin and closing upon an upper barrel bevel; and
   wherein the plurality of lower valve tabs is attached perpendicular to the lower front plate and the lower back plate.

11. The dual plate backflow and breakaway check valve of claim 10 wherein the breakage of the groove causes a residual back pressure of fluid in at least one pipeline connected to the dual plate backflow and breakaway check valve.

12. The dual plate backflow and breakaway check valve of claim 10 further comprises a top mounting flange attached to the upper portion and a bottom mounting flange attached to the lower portion.

13. The dual plate backflow and breakaway check valve of claim 12 wherein a circumference of the top mounting flange and the bottom mounting flange is arranged with a plurality of flange holes.

14. The dual plate backflow and breakaway check valve of claim 10 wherein the upper front plate and the upper back plate are arranged inside the upper portion of the barrel assembly utilizing a plurality of upper valve springs and an upper valve pin designed to insert through a plurality of upper plate pin holes.

15. The dual plate backflow and breakaway check valve of claim 10 further comprises an upper valve bar and a lower valve bar attached inside the upper portion and the lower portion, respectively.

16. The dual plate backflow and breakaway check valve of claim 10 wherein the lower front plate and the lower back plate are arranged inside the lower portion of the barrel assembly utilizing a plurality of lower valve springs and a lower valve pin designed to insert through a plurality of lower plate pin holes.

17. A dual plate backflow and breakaway check valve comprising:
   A barrel assembly having an upper portion, a lower portion, a top mounting flange, a bottom mounting flange and a groove;
   an upper dual valve having an upper front plate and an upper back plate arranged inside the upper portion of the barrel assembly utilizing an upper valve pin and a plurality of upper valve springs;
   a lower dual valve having a lower front plate and a lower back plate arranged inside the lower portion of the barrel assembly utilizing a lower valve pin and a plurality of lower valve springs;
   a plurality of holes located at the lower front plate and the lower back plate; and
   a lower valve keeper bar arranged within the upper portion of the barrel assembly, the lower valve keeper bar moves up from between the plurality of lower valve tabs upon breakage of the groove thereby allowing the lower front plate and the lower back plate to rotate about the lower valve pin and closing the lower dual valve upon a lower barrel bevel and simultaneously allowing the upper front plate and the upper back plate to rotate about the upper valve pin and closing upon an upper barrel bevel;
   wherein the plurality of lower valve tabs is attached perpendicular to the lower front plate and the lower back plate.

18. The dual plate backflow and breakaway check valve of claim 17 wherein the upper valve pin is designed to insert through a plurality of upper plate pin holes and the lower valve pin is designed to insert through a plurality of lower plate pin holes.

19. The dual plate backflow and breakaway check valve of claim 17 further comprising:
   at least one upper pin mounting hole to connect the upper dual valve and the upper portion of the barrel assembly together utilizing at least one upper pin set screw;
   an upper valve bar attached inside the upper portion;
   at least one lower pin mounting hole to connect the lower dual valve and the lower portion of the barrel assembly together utilizing at least one lower pin set screw;
   a lower valve bar attached inside the lower portion; and
   a plurality of lower valve tabs attached perpendicular to the lower front plate and the lower back plate.

20. The dual plate inversely mounted backflow and breakaway check valve of claim 19 is designed to mount above grade level.

* * * * *